United States Patent [19]

Medley et al.

[11] 4,076,570
[45] Feb. 28, 1978

[54] PROCESS FOR THE PRODUCTION OF A MULTIPLE LAYER LAMINATE

[75] Inventors: Ronald D. Medley, Big Spring, Tex.; James R. Chapman, Atlanta, Ga.

[73] Assignee: Cosden Technology, Inc., Big Spring, Tex.

[21] Appl. No.: 525,480

[22] Filed: Nov. 20, 1974

[51] Int. Cl.² .............................................. B29G 3/00
[52] U.S. Cl. .................................... 156/244; 156/500; 428/518
[58] Field of Search ............... 156/244, 331, 332, 334, 156/500; 161/253, 254, 255, 256; 264/45.9, 46.1, 46.2, 46.3, 171, 176 R

[56] References Cited

U.S. PATENT DOCUMENTS

| 3,206,354 | 9/1965 | Pooley | 161/253 |
| 3,396,062 | 8/1968 | White | 156/244 |
| 3,589,976 | 6/1971 | Erb | 156/244 |
| 3,620,900 | 11/1971 | Williger | 161/253 |
| 3,645,838 | 2/1972 | Newman et al. | 428/519 |
| 3,654,069 | 4/1972 | Freudenberg | 156/331 |
| 3,748,218 | 7/1973 | Newman et al. | 428/515 |
| 3,755,050 | 8/1973 | Golden et al. | 161/253 |
| 3,798,103 | 3/1974 | Gaunt | 156/244 |

FOREIGN PATENT DOCUMENTS 1,364,176  8/1974  United Kingdom.

*Primary Examiner*—Caleb Weston

[57] ABSTRACT

Disclosed is a process for producing a laminate having at least three layers comprising a base layer of polystyrene, an intermediate layer of an ABS polymer and a third barrier layer of a vinyl chloride or vinylidene chloride polymer comprising the steps of co-extruding through a single die orifice a heat plastified composite structure comprising a base layer of polystyrene and a surface layer of an ABS polymer and thereafter laminating a preformed layer of a barrier material polymer to the ABS surface layer of the co-extruded composite.

17 Claims, 4 Drawing Figures

PROCESS FOR THE PRODUCTION OF A MULTIPLE LAYER LAMINATE

BACKGROUND OF THE INVENTION

The present invention relates to the production of laminated structures of thermoplastic resinous materials, and more especially, to a process for the production of multiple-layered laminates having at least three layers of different thermoplastic synthetic resinous material.

In recent years the use of laminates constructed from two or more layers of different thermoplastic synthetic resinous materials has gained widespread acceptance in the packaging and container field. Typically, an individual laminated product is tailored specifically to the end use contemplated for the material, and the thermoplastic materials utilized for each of the respective layers of the laminate are chosen accordingly. Hence, in some instances a good heat sealing material, such as polyethylene, may be chosen for one or more surface layers of a laminated product which requires heat sealing for closure, while in other instances polymers having excellent chemical resistance properties, such as acrylic ester polymers or fluorine containing polymers, may be chosen as surface layer materials, and in still other areas of utility a thermoplastic material having desirable barrier properties, e.g., saran, may be chosen for one or more of the individual layers of a laminated product.

The manner and ease of producing laminates of the foregoing type depends upon the particular polymeric materials chosen to construct the laminate and, to some extent, also upon the configuration of these materials in the final laminated product. It is possible to produce most laminated structures by independently forming each layer, for example, by extrusion, and then joining the individual layers either immediately as they exit from the extrusion equipment in a heat-plastified state or by joining such pre-formed materials under the influence of heat and pressure. Proceeding according to this method, however, usually requires a large investment in equipment and oftentimes results in an unsatisfactory product, e.g., inadequate bonding of layers.

On the other hand, many types of thermoplastic synthetic resinous materials, although, they possess excellent chemical and/or physical properties, cannot be made to readily or securely bond to other types of polymeric material with which it may be desired to combine them to form multiple layer laminated materials. Under these circumstances, it is necessary to interpose a layer of an adhesive material between the respective layers of polymeric material in order to produce a satisfactory laminate, and to accomplish this by conventional laminating techniques usually requires additional equipment or very complex and costly equipment designed specifically to accomplish this result. See, for example, U.S. Pat. No. 3,184,358.

Although the use of laminates constructed from two or more layers of different thermoplastic synthetic resinous materials has gained widespread acceptance in the packaging and container field in recent years, thermoformed and particularly deep drawn thermoformed products have, however, remained basically single layer materials, principally high impact polystyrene. The reason for this is that high impact polystyrene is relatively inexpensive, is easy to thermoform, and has good structural strength characteristics. However, polystyrene is fairly permeable by gases. This makes it unacceptable for packaging spoilable food items, carbonated beverages, etc. For this reason it has previously been suggested that there be added a layer having high barrier characteristics such as polyvinyl chloride (PVC), polyvinylidene chloride (PVDC) or copolymers thereof such as saran. See, for example, U.S. Pat. Nos. 3,798,103 to Gaunt; 3,654,069 to Freudenberg; 3,458,392 to Kremer and 3,328,196 to Sincock.

As mentioned in these patents, however, lamination of a barrier layer to polystyrene is difficult to obtain. Therefore, special procedures and/or adhesives have been used. Thus, Sincock discloses using a solvent coated polymethacrylate adhesive as a subcoat beneath a saran film or saran emulsion coating. Kremer solvent coats a combination wood rosin and liquid polystyrene adhesive as the bonding agent between layers of polystyrene and saran. Others, such as Newman in U.S. Pat. Nos. 3,645,538 and Lee in 3,415,920, have found it necessary to place the saran interiorly as a middle layer between polystyrene or other plastic layers with an adhesive layer on each side of the saran. It is suggested in this latter patent to employ as an adhesion-promoting agent for bonding the outer polyolefin layers to the centrally disposed barrier layer polymeric materials such as copolymers of chlorinated ethylene and ethyl acrylate, copolymers of ethylene and vinyl acetate and chlorinated polyethylene having from about 20 to 40 weight percent chlorine.

Placing the barrier material layer on the interior of the laminate represents a significant disadvantage, because it means that a layer of non-barrier material must be interposed between the barrier material layer and the package contents. This layer of non-barrier material gives rise to a wicking action which negates the effectiveness of the barrier layer. Moreover, the non-barrier material may stress crack and destroy the functionality of the entire laminate.

However, with such a crystalline material as a barrier layer in the laminate, it is difficult to thermoform without blistering and delamination occurring during the drawing operation. Generally, the strength of the lamination bond controls this feature. The adhesive strength also determines the amount of delamination later suffered when handling, or peeling off lids, labels, or like attachments to the laminated container. Similarly, the adhesive strength of the bond and crystalline nature of the barrier layer have other effects on the deep-draw characteristics of the laminate. Many such laminates cannot be thermoformed adequately since at the desired lower temperatures which will produce an orientation of the crystalline layer, the lamina will not stretch adequately, but will fracture and delaminate. On the other hand, if thermoformed at a higher temperature, the stretching will not produce an oriented barrier film. In either case, the resulting features such as water-vapor transmission rate (WVTR) and oxygen transmission rate (OTR) will not be adequate for many container packaging purposes.

The type of prior art laminates discussed above suffer from one or more of these defects. In addition, those that utilize solvent based adhesives or emulsion coatings require high capitalization costs due to the types of laminators, coaters, drying ovens, etc., required. There is also considerable waste in all of the aforementioned processes in that the trimmed materials are not as recoverable in adhesive lamination operations as, for example, in extrusion processes.

With the advent of coextrusion processes, it is now possible to coextrude many combinations of thermoplastic synthetic resinous materials which yield multiple-layer laminates having desirable properties and characteristics. See, for example, British Pat. No. 1,364,176 which discloses coextrusion of high impact polystyrene and acrylonitrile-butadiene/styrene (ABS); U.S. Pat. No. 3,746,609 which discloses coextrusion of a polystyrene material and a polyamide; U.S. Pat. No. 3,798,103 which discloses coextrusion of high impact polystyrene and polyvinyl chloride or Barex; and U.S. Pat. No. 3,654,069 which discloses as one embodiment coextrusion of high impact polystyrene and styrene-acrylonitrile copolymers to which a polymethylmethacrylate film may be laminated.

Still with other types of thermoplastic synthetic resins such as barrier materials, like saran, special considerations are presented insofar as processing by extrusion or coextrusion is concerned as a result of their corrosive nature and other unusual properties, so that coextrusion of these materials has been severely limited. Thus, the use of these polymeric materials in multiple-layered laminates has been solely restricted to the solvent-based adhesive layer or inner saran layer arrangements previously discussed. This is despite the fact that it is desirable to have an outer barrier layer which can serve as the interior layer of a food container, which can be sterilized and which is attractive. It has not been possible to successfully coextrude a saran-polystyrene laminated material with a saran exterior layer. Accordingly, the limitations of poor adhesion and processing difficulties with saran have resulted in the inability to conveniently produce a suitable laminate of polystyrene and saran wherein the saran occupies the position of at least one outside layer of the laminate. A convenient method of producing such a product would be highly desirable.

SUMMARY OF THE INVENTION

Therefore, it is an object of the present invention to provide an improved process for producing a multiple-layer laminated material from polystyrene and a barrier layer of either polyvinyl chloride, polyvinylidene chloride or copolymers thereof.

It is also an object of the present invention to provide a process for producing a multiple-layer laminated material wherein a layer of said barrier material forms at least one exterior layer of the laminate and polystyrene forms the principal base layer of the laminate.

Another object of the invention is to provide a method for producing a polystyrene-saran laminate wherein suitable adhesion is produced between the aforesaid barrier layer and the polystyrene layer.

In accomplishing the foregoing objects, there has been provided in accordance with the present invention a process for the manufacture of a laminated structure having a base layer of polystyrene, an intermediate layer of ABS polymer and a surface layer of a barrier layer material selected from the group consisting of a vinylidene chloride co-polymer, a vinyl chloride polymer and copolymers thereof. The process comprises the steps of co-extruding through a single extrusion die orifice a heat plastified composite structure comprising a base layer of polystyrene and a surface layer of an ABS polymer, and thence laminating a pre-formed layer of the aforesaid barrier layer material to the ABS surface layer of the co-extruded laminate. The process is adapted specifically for the production of a three-layered laminated structure having an outer layer of barrier layer material, preferably saran. In the process, the pre-formed layer of barrier layer material may be supplied either from a commercially available roll of such material or there may alternately be provided a second extrusion die orifice for the in situ formation of the barrier material layer immediately before laminating this layer to the ABS polymer layer of the co-extruded composite.

Other objects, features and advantages of the present invention wll become apparent from the following detailed description of the invention when considered together with the attached figures of drawing.

DETAILED DESCRIPTION OF PREFERRED EMBODIMENTS

Figure 1:
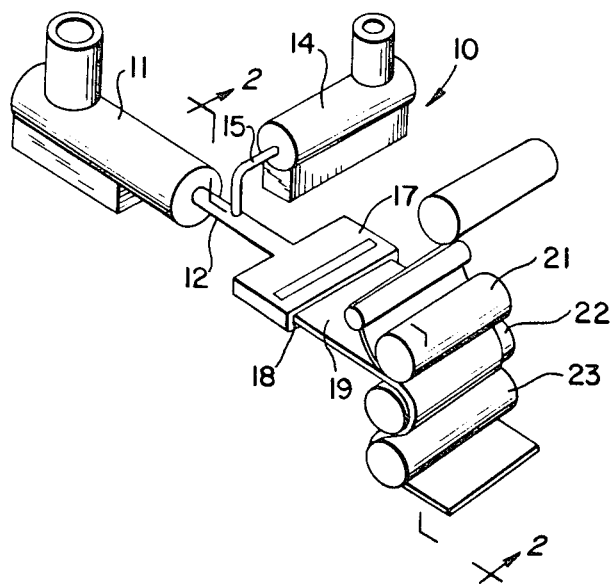
FIG. 1 is a perspective view schematically representing the configuration of apparatus for carrying out the lamination process of the present invention.

In accordance with the present invention, there has been provided a multiple-layer laminate which permits the use of a barrier layer of a vinylidene chloride copolymer (PVDC) or vinyl chloride polymer or copolymer (PVC) as one or more exterior layers in combination with and firmly bonded to a polystyrene base layer, i.e., without the need of encapsulating the vinylidene chloride copolymer as an interior layer of the laminated structure. The laminates of the present invention which are characterized by the three layer combination of polystyrene, ABS and PVDC or PVC, respectively, exhibit excellent chemical and physical properties and accordingly are particularly well suited for use in the field of packaging. Most importantly, the intermediate layer of an ABS polymer provides an adhesive or bonding effect between the vinylidene chloride polymer layer and the polystyrene layer in order to produce the necessary degree of adhesion therebetween and overcomes a significant limitation heretofore experienced in attempts to provide a suitable polystyrene-saran laminate.

The laminated material has a peel strength of 3–8 lbs/inch, has good water vapor transmission rates (WVTR) and oxygen transmission rates (OTR) as a flat sheet, and even better ones after thermoforming. In fact, the bond between the saran or PVC and the ABS intermediate layer has been found to be nearly integral, with the separation on testing occurring between the polystyrene and ABS. However, the stiffness of ABS due to its modulus (compared to many adhesive resins) and its thickness aid in resisting bond failure. Thus, when heat sealed (i.e., lid stock, for example, may be heat sealed to a container for peeling from the container flange when opening), the bond between the ABS and polystyrene is not subjected to the same "peel" force needed to open the container as the stiff ABS flange or portion of the flange also resists the peeling. Likewise, the hot bond strength (at 270° F to 300° F.) is sufficient to permit thermoforming without any delamination of the layers. Therefore, during the thermoforming the barrier layer is stretched and oriented improving its barrier properties such as its WVTR rate, OTR rate and chemical resistance.

The polystyrene provides the structural strength for the laminate and containers formed thereof. The ABS, as mentioned, provides the adhesive strength. It also adds to the chemical and grease resistance of the overall laminate and aids in prevention of any solvatory effect (aromatic residuals in the polystyrene bleeding through) on the barrier layer. Further, because of the type of material and thickness used, the ABS adhesive may be colored to give a second color (different from the styrene color) of desired opacity. This color will show through a clear barrier layer with the barrier layer preventing leaching of the dye or pigment from the ABS. Thus, the appearance is of a two-colored laminate. The barrier layer also provides for the good OTR and WVTR rate mentioned. Most preferred is a PVDC-PVC copolymer such as saran since this material gives the best barrier properties with the thinnest layer. However, PVC polymers may also be used advantageously, although, a somewhat thicker layer is needed and even then the performance does not quite match the polyvinylidene chloride copolymer materials.

Although the preferred laminates in accordance with the present invention are three layered structures having a base layer of polystyrene, an intermediate layer of ABS and a surface layer of barrier material polymer, it is also possible to produce laminated structures having more than three layers. For example, it is possible to provide a five layer structure having an inner core of polystyrene, two intermediate layers on either side thereof of an ABS polymer and two exterior layers on either side of the laminate of barrier material polymer. Similarly, it is possible to provide two interior, base layers of polystyrene separated by one or more intermediate layers and to provide exterior coatings on one or both polystyrene layers of ABS and barrier material polymer, as described immediately above. And while it is preferred that the barrier material polymer layer occupy the position of the exterior-most layer, it is also contemplated in accordance with the invention that one or more additional layers of material may be provided on top of the barrier material layer.

The laminates of the invention may be produced either as film products, i.e., having a thickness of less than 10 mils, or as sheeting products, i.e., those having a thickness greater than 10 mils. For the production of plastic packaging containers and the like, it is generally preferred to utilize the laminated structures of the present invention in the form of sheeting, and in this regard, a base layer of polystyrene having a thickness of at least 5 mils and up to about 80 mils or more is typically utilized. Most preferably the polystyrene base layer has a thickness ranging between about 10 and about 40 mils. The intermediate layer of ABS polymer may have a thickness as low as one-half or one-quarter mil, i.e., enough to provide a continuous coating over the polystyrene substrate, although typically the ABS layer has a thickness ranging between about 1 and 7 mils, and most preferably between about 4 and 6 mils. Similarly, the layer of barrier material polymer may have a thickness as low as about 0.5 mil up to any desired thickness; however, most typically this layer will range between about 0.5 and 5 mils in thickness and most preferably between about 1 to 5 mils for PVDC copolymers and 5 to 10 mils for PVC. There is no absolute upper or lower limit on the overall thickness of the laminated products manufactured in accordance with the invention, as these values are dependent upon a number of layers and the thickness of each of the individual layers.

According to the method for preparing the products of the present invention, there is first produced a composite of the base layer of polystyrene bearing on at least one surface a layer of an ABS polymer which acts as the intermediate layer in the ultimate laminated product. The two-layered composite of polystyrene and ABS is prepared by a co-extrusion method, both for purposes of economics and practicality as well as to insure that a suitable bond is achieved between the polystyrene and ABS layers. Products having the most desirable properties are produced by this process involving co-extrusion of styrene polymer and ABS.

By the term co-extrusion process there is meant a process wherein the multiple layered composite comprising the layer of polystyrene and the layer of ABS is extruded through a single extrusion die orifice. Many types of co-extrusion processes are known in the prior art, for example, those employing multi-manifold co-extrusion dies, multi-cavity or die-within-a-die configurations; however, the most suitable type of co-extrusion technique for producing the polystyrene-ABS preliminary composite in accordance with the present invention is the procedure described in copending United States patent application Ser. No. 519,682, filed Oct. 31, 1974 by Donald F. Wiley and assigned to Cosden Oil & Chemical Company. This application describes a process for co-extruding laminates of ABS and polystyrene exhibiting uniform layer thickness, good surface characteristics and firm adhesion between the layers. In particular, the process involves joining a heat plastified stream of polystyrene and a heat plastified stream of ABS polymer in a generally circular conduit upstream of a conventional manifold sheeting extrusion die to form a composite, stratified stream of the two resinous materials having a relatively sharply defined juncture plane between the individual components or strata of the stream. This combined stream is then conveyed through the conduit to the sheeting die while controlling the melt viscosities of the individual thermoplastic resinous components to bring the two values as close together as possible, and then the combined stream is passed through the extrusion die in such a manner that the die lips are generally aligned or parallel with the plane of the interface or interfaces between the strata of the combined stream. The disclosure of the above mentioned co-pending U.S. application is hereby incorporated by reference for a further understanding of this preferred co-extrusion process.

One of the important aspects in preparing the laminates according with the present invention involves the achievement of suitable bond strength between the styrene polymer base layer and the intermediate ABS adhesive layer. In order to have a suitable final laminate, it is necessary that a bond or peel strength of at least about 3 or 4 lbs/inch exist between the ABS and styrene polymer layers. Selection of suitable ABS materials to achieve this result is explained in the above-mentioned copending application. This involves the use of a "bonding factor" which is correlated to the solubility parameters exhibited by the respective styrene, acrylonitrile and butadiene components in the ABS polymer, and in particular, matching this bonding factor with the solubility parameter of the styrene used in the base layer of the co-extrudate. Reference is made to the copending application for further details of selecting appropriate ABS materials, since this forms no part of the present invention.

After formation of the polystyrene-ABS preliminary co-extruded composite as described above, a layer of a PVDC, PVC or saran polymer is added thereto in order to produce the laminated structures of the present invention having at least three layers. Most expeditiously, the layer of barrier material polymer is laminated to the ABS surface layer of the preliminary co-extruded composite immediately after the preliminary composite emerges from the co-extrusion die orifice, and is thus still in a heat plastified or at least hot condition. The layer of barrier material polymer is supplied as a preformed layer, which may be accomplished either by supplying it as a commercially available product from a roll, or alternatively by installing an additional extruder and extrusion die in the appropriate position so that a film or sheet of barrier material polymer is produced by extrusion immediately prior to being applied to the ABS surface layer of a preliminary polystyrene-ABS co-extruded composite. Subsequent to laying the layer of barrier material polymer onto the surface of the co-extruded polystyrene-ABS composite, the entire laminated structure is passed between two or more conventional rolls in order to consolidate the bond between the joined laminae, cool the thermoplastic material below the temperature of heat plastification and provide the desired surface characteristics on the final product. While it is preferred to apply the PVDC, PVC or saran polymer layer while the co-extruded polystyrene-ABS composite is still in a heat plastified condition after leaving the co-extrusion die apparatus, it will be appreciated that bonding of the barrier material polymer layer to the preliminary co-extruded composite may be achieved after the preliminary composite has been cooled below the temperature at which it is heat plastified, for example, by providing the barrier material polymer as an extruded sheet in a heat plastified condition or by joining a layer of barrier material polymer with the preliminary co-extruded composite, neither of which is in a heat plastified condition, and subsequently subjecting the combined layers to a heat and/or pressure treatment step which renders one or both of the components in a heat plastified condition such that adequate bonding is achieved.

In the most preferred embodiment of the invention, as discussed above, the barrier material layer is applied to the ABS surface layer of the co-extruded composite while the composite is still in a heat plastified condition after leaving the co-extrusion die. Thus, the heat energy from the co-extrusion process is utilized to advantage in the bonding step for the barrier layer, an advantageous feature of the invention in comparison to solvent bonding and/or normal laminating techniques. It is preferred that the barrier material be heated to approximately its melting point as the newly-formed laminate is passed through the first set of nip rolls; however, suitable laminated products can be prepared at temperatures somewhat below the melting temperature, as well as at temperatures up to the degradation temperature of the barrier material employed. For example, with saran chosen as the barrier material, the temperature for the barrier layer may range between about 380° and 430° F., and is preferably between about 405° and 415° F. With PVC, a temperature range of from about 400° to 450° F. is suitable, whereas the preferred temperature is between about 420° and 430° F.

The heat sensitivity of these barrier layer materials, as well as the fact that the foregoing temperatures are below the optimum temperatures for co-extruding the polystyrene and ABS militate against a process involving simultaneous co-extrusion of all layers. Control of the barrier layer may be accomplished in a number of ways. For example, the temperature of the co-extruded polystyrene/ABS composite may be controlled by adjusting the extrusion temperatures of the materials (within certain limits), by providing additional heating or cooling to the composite after it leaves the extrusion die or, most simply, by selecting the appropriate distance between the die and the point of applying the barrier layer. Alternatively, the temperature of the barrier material may be increased before applying to the surface of the co-extruded composite.

The term polystyrene as employed herein includes both homopolymers of styrene and copolymers of styrene with other polymerizable and polymerized monomers. Included within the latter category are impact polystyrenes which comprise graft copolymers of styrene upon conjugated diene backbone polymers such as polybutadiene, butadiene-styrene copolymers, butadiene-acrylonitrile copolymers, natural rubber, and the like. Likewise included in this category are normal copolymers of styrene with other well known conventional monomers.

Similarly, the terms vinyl chloride and vinylidene chloride polymer are intended to mean homopolymers and copolymers of vinyl chloride and copolymers of vinylidene chloride with up to 30% of one or more monomeric materials copolymerizable therewith. Suitable vinylidene chloride copolymers are prepared utilizing such comonomers as methyl, ethyl, isobutyl, butyl, octyl and 2-ethylbexyl acrylates and methacrylates; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid; methyl alpha-chloroacrylate, octyl alpha-chloro-acrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenylvinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Pat. No. 2,160,943. These compounds may be described as vinyl or vinylidene compounds having a single $CH_2=C$ group. The most useful ones fall within the general formula

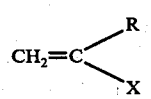

where R may be hydrogen, a halogen or a saturated aliphatic radical and X selected from one of the following groups:

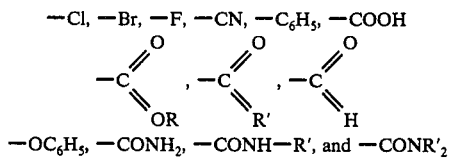

in which R' is alkyl. A preferred barrier layer polymer is a copolymer of vinylidene chloride and vinyl chloride known as Saran.

The term ABS polymer is intended to be interpreted in its broadest sense to characterize the now well known class of graft copolymers prepared from butadiene rubber and acrylonitrile and styrene monomers. To be included within the scope of this definition, the polymer must be mainly comprised of polymeric units which are obtained by polymerizing styrene and acrylonitrile monomer in the presence of a conjugated diene backbone polymer. As is well understood in the art, however, the definition also includes within its scope graft copolymers wherein minor amounts of other monomeric materials, e.g., acrylic esters, are copolymerized with the styrene and acrylonitrile monomers in the presence of a conjugated diene. Suitable ABS compositions typically comprise between about 5 and 25% acrylonitrile and between about 2 and 15% rubber, although it is preferred within the context of the present invention to employ ABS compositions containing between about 10 and 20% acrylonitrile and between about 5 and 10% rubber and have certain solubility parameters and other characteristics as more fully set forth in copending application Ser. No. 519,682, filed Oct. 31, 1974, by Donald F. Wiley and assigned to Cosden Oil and Chemical Company. Advantageous results have been obtained with ABS resins sold by Dow Chemical Co., Midland, Michigan under the designations DOW 213 and DOW 230 which have proven to yield adequately adhering layers in the laminated products of the present invention.

Referring now to the drawings, in FIG. 1 there is schematically illustrated an apparatus, generally designated by the reference numeral 10, which is adapted for carrying out the process of the present invention. The apparatus comprises in cooperative combination a first extruder 11 for the extrusion of polystyrene in a heat plastified condition through the discharge conduit 12. A second extruder 14 having a discharge conduit 15 is adapted to provide a minor stream of heat plastified ABS polymer. Conduit 15 terminates at conduit 12 at a point upstream of the sheeting extrusion die 17 which is in operative communication with conduit 12 and receives a flow therefrom. Co-extruded sheet 19 having a base layer of polystyrene and a surface layer of ABS polymer is formed at the lips 18 of extrusion die 17 and is thereafter carried from the die by means of the force exerted by the bank of polished cooling rollers 21, 22 and 23. At a position intermediate the die lips 18 and the first pair of rollers 21 and 22 and mounted at a location above the co-extruded sheet 19 is an intermediate idler roll 41 which serves to carry and effect transfer of a pre-formed sheet of barrier material polymer 43 onto roll 21 for ultimate lay-down on co-extruded composite 19. The preformed barrier material sheet is drawn from a storage roll 45 mounted at a second position above the idler roller 41.

Figure 2:
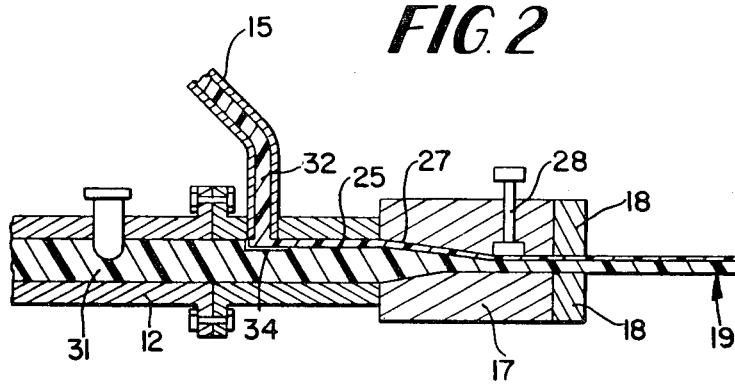
FIG. 2 is a cross-sectional view taken along the line 2—2 in FIG. 1.

In FIG. 2 there is illustrated a sectional view of the portion of the apparatus shown in FIG. 1 ahead of the extruder 11, including the discharge conduits 12 and 15, extrusion die 17 and the cooling roller arrangement 21, 22 and 23. This view illustrates the interaction of conduits 12 and 15 in the co-extrusion process, and the configuration of the polystyrene resin 31 and the ABS polymer 32 as they are combined in conduit 12 to form a stratafied stream having an interfacial juncture plane 25. In this form of co-extrusion, stratification at the intersection point of the two thermoplastic resinous material may be aided by the optional placement of a metal plate 34 positioned in conduit 12 adjacent the entry point of co-extruder discharge conduit 15. Also, there is illustrated the passage of the stratafied resin stream into the die manifold 27, past restrictor bar 28 and ultimately through the extruder die lips 18. Throughout the entire traversal of the extrusion equipment, the individual layers of resinous material in laminar flow maintain their stratafied relationship to form a final product having a substantially uniform surface layer of ABS upon a polystyrene substrate. This Figure also illustrates in more detail the application of the surface layer of barrier material polymer 43 upon the intermediate ABS polymer layer of the co-extruded composite 19. As layer 43 is brought to bear on the surface of the heat plastified co-extruded composite 19, the entire three layer assembly is passed between the pressure biased cooling rolls 21 and 22 in order to press the layers into firm contact with one another and solidify the bond therebetween by cooling the plastic materials to a temperature below that at which they are heat plastified condition. Firm bonding may be assured by providing, for example, a restricted clearance between rollers 21 and 22 and/or a slight excess or build-up of polymer material immediately ahead of the roller nip. These techniques are conventional. A firmly bonded three layer laminated structure 20 exits from the final cooling roller 23. The cooling roller assembly 21, 22 and 23 is a conventional configuration utilizing conventional polished cooling rolls. The rolls are maintained at temperatures which are sufficient to assure that the laminated structure leaving the rolls is cooled below its orientation temperature (Tg). This is generally about 140°–145° F. If the material exits from the bottom roll at temperature grossly divergent from this, the usual problems will arise, e.g., sticking, over-orientation. For optimum performance during subsequent thermoforming of the laminate, it is preferred to keep orientation below about 6%. An auxilliary air knife can be added to the cooling roll assembly, if desired, to facilitate cooling.

Figure 3:
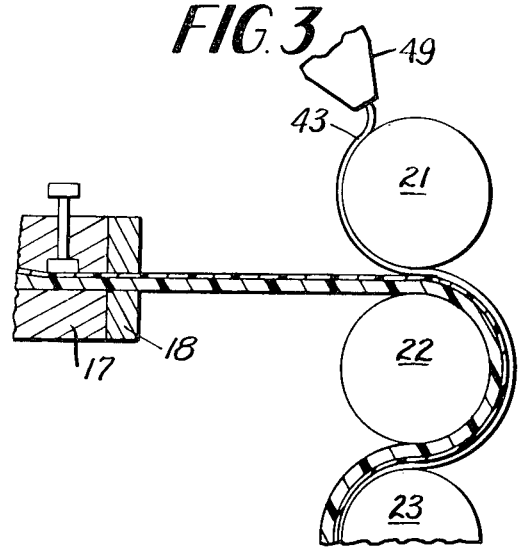
FIG. 3 is a cross-sectional view of a portion of the apparatus illustrated in FIG. 2 showing an alternative means of supplying the surface layer of vinylidene chloride polymer.

In FIG. 3 is illustrated an alternative means for supplying the coating layer of barrier material polymer 43 to the co-extruded polystyrene-ABS composite 19 as it exits from the extrusion die 17. In this alternative embodiment, there is employed instead of a storage roll of commercially available polymer film a second extrusion die apparatus 49 from which the layer of barrier material polymer is extruded immediately prior to its being brought into contact with the surface of co-extruded laminate 19. In view of presently unsolved problems with extrusion of barrier type material, this represents a less preferred embodiment.

Figure 4:
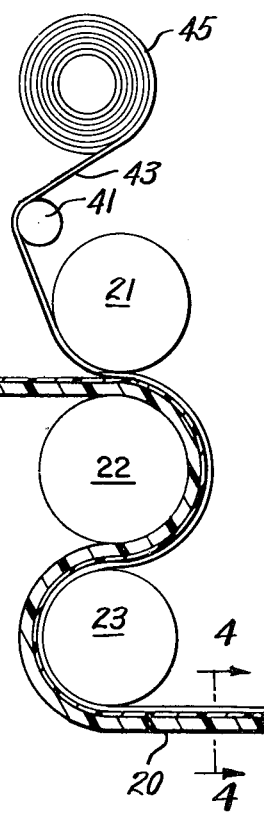
FIG. 4 is a cross-sectional view of a multiple-layer laminate produced in accordance with the present invention.
Figure 4:
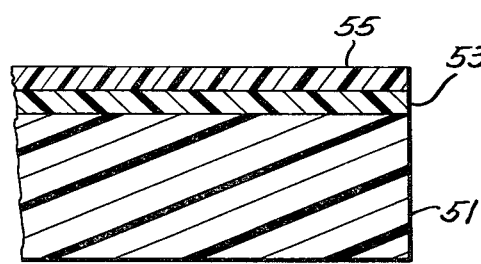

FIG. 4 illustrates the cross section of a multiple-layer laminate produced in accordance with the present invention. The laminate is characterized by a base layer 51 of polystyrene, an intermediate layer 53 of an ABS polymer and a surface layer 55 of a barrier material polymer. As discussed above, it is contemplated within the scope of the present invention to provide, for example, another intermediate layer such as layer 53 on the bottom side of the polystyrene base layer 51 and a bottom surface layer of a barrier material polymer such as layer 55 covering the second intermediate layer. Other combinations of layers, as discussed hereinabove, are also contemplated according to the invention.

The following specific example is provided to facilitate a better understanding of the invention, it being understood that the same is intended to be merely illustrative and not in any sense limitative.

EXAMPLE

A main resin stream of impact polystyrene (Cosden Oil & Chemical Company 825D Pellets) is extruded from a four and one-half inch diameter two-stage vented extruder containing a high compression ratio screw. A two inch diameter 24:1 single stage side extruder also having a high compression ratio screw is arranged as illustrated in FIGS. 1 and 2 of the drawings and supplies a second stream of ABS resin (Dow Chemical Company 213 White). The polystyrene is extruded at a temperature of 440° F. and at a feed rate of approximately 600 lbs. per hour. The ABS side stream is discharged from the 2 inch extruder at 430° F. at a feed rate of about 95 lbs. per hour. The stream of resinous material produced in the discharge conduit of the large extruder is conducted to a center-fed sheeting extrusion die which opens to an extrusion slit having a width of 44 inches with its lips at approximately 39 mils. The die temperature averages about 450° F.

A roll of saran film (Dow Saran L-18) having a width of 40 inches and a film thickness of 2 mils is fed down to the nip roll where the saran and the co-extruded polystyrene/ABS materials are joined. At this point the heat plastified polystyrene-ABS co-extrudate is maintained at 410° F. After passing through the nip, the 3 layer product passes around a pair of 18 inch polished chromed cooling rolls, the top nip roll being supplied with coolant at 120° F., the middle roll at 160° F. and the bottom roll at 120° F. Roll pressures at top and bottom are maintained at approximately 90 pounds per lineal inch (pli) at a gap setting of 40 mils.

Examination of the final multiple layer sheeting product evidences three uniform layers, namely, a surface layer of saran polymer film having a thickness of 2 mils, an intermediate layer of ABS having a thickness of approximately 6 mils and a base layer of polystyrene having a thickness of approximately 32 mils. The relative thicknesses of polystyrene and ABS layers corresponds closely with the relative feed rates for the two resins in the co-extrusion process. The surface layer of saran is firmly bonded to the co-extruded polystyrene ABS substrate and can only be separated therefrom with extreme difficulty. The peel strength of the material is approximately 5 lb/in.

Two laminates made in accordance with the present invention were tested for water vapor transmission and oxygen transmission. These laminates were then thermoformed in the preferred manner, and the transmission rates again tested. The resulting data is given in the table below, where Runs 1 and 6 are laminates of the present invention. For comparison purposes, Runs 2–5 and 7 were made of various laminates as indicated.

TABLE

| Runs | 1 | 2 | 3 | 4 | 5 | 6 | 7 |
|---|---|---|---|---|---|---|---|
| Material | HIPS ABS PVDC FILM | HIPS 20#/ REAM PVDC coated | HIPS PVDC PE | HIPS | PVC | HIPS ABS PVDC FILM | HIPS PVDC PE |
| Gages – Inches | .042 | .040 | .036 | .040 | .030 | .064 | .064 |
| Container Volume | 140cc | 140cc | 140cc | 140cc | 140cc | 160cc | 160cc |
| Container Draw Ratio | 3.97 | 3.97 | 3.97 | 3.97 | 3.97 | 6.3 | 6.3 |
| Flat WVTR-gm/100 in$^2$ At Stated Gage-24hr. | .099 | .104 | .075 | .220 | .085 | .120 | .060 |
| WVTR-Formed Container | .048 | .069 | N/A | .180 | .053 | .100 | N/A |
| WVTR-Formed Container Adj. to 100 in.$^2$ and Divided by Draw Ratio | .054 | .076 | N/A | .200 | .058 | .058 | N/A |
| Orientation Improvement Flat WVTR divided by Adj. Container WVTR | 1.85 | 1.35 | N/A | 1.10 | 1.46 | 2.07 | N/A |
| Flat OTR cc/100 in.$^2$ at Stated Gage-24 hr. 75° F/50% RH/100% O$_2$ | .600 | 1.10 | 1.67 | 9.00 | .420 | .500 | .056 |
| OTR Formed Container at 100% O$_2$ Content | .300 | .630 | 6.65 | 7.87 | .238 | .715 | 2.48 |
| OTR Formed Container adjust to 100 in.$^2$ and Divided by Draw Ratio | .335 | .693 | 9.70 | 8.71 | .267 | .410 | 1.62 |
| Orientation Improvement Flat OTR Divided by Adj. Container OTR | 1.79 | 1.57 | .173 | 1.03 | 1.57 | 1.22 | .034 |

HIPS = High Impact Polystyrene
ABS = Acrylonitrile-Butadiene-Styrene
PVDC Film = Dow L18 Saran .002 in.
PVDC coated = PVDC Emulsion Coating
PE = Polyethylene As can be seen from the Table the laminate of the present invention has WVTR and OTR equal to or better than any of the other materials in a flat sheet, and exceeds the others, with the possible exception of the thick PVC film, in WVTR and OTR in terms of the formed sheet. In comparison with the other laminates Runs 1 and 6 are clearly superior. This is believed due to the extremely strong bond achieved in the laminate of the present invention. This bond permits thermoforming and consequent orientation of the barrier material without any delamination. The multi-lateral type of orientation, then, gives the increased barrier properties of the formed material as compared to the flat sheet. Axial or bi-axial orientation of the flat laminate before forming is not desired since it will not, then, draw uniformly. Optimum barrier conditions are, as shown, achieved at about 400% stretch of the flat sheet on thermoforming, although draw ratios of over 2:1 are adequate.

The chemical resistance of the laminate of the present invention when compared to polystyrene, for example, is such that a formed container of the present invention will hold toluene for 10 minutes whereas the polystyrene cup cannot be filled before it dissolves.

As is apparent, these advantageous features make the laminate of the present invention ideally suited for packaging containers, although, other uses such as for rigid or semi-rigid materials having such properties would be apparent to one of ordinary skill in the art.

While the fundamental novel features and advantages of the invention have been pointed out and described in connection with two illustrated embodiments thereof, it will be appreciated that various obvious modifications of the subject process and the resulting products will suggest themselves to a person of ordinary skill in the art. Therefore, it is intended to be limited only by the scope of the following claims.

What is claimed is:

1. A process for the manufacture of a laminated structure comprising a base layer of styrene polymer, an intermediate layer of an ABS polymer and a surface layer of a barrier material comprising a vinylidene chloride copolymer having copolymerized therein vinylidene chloride monomer and up to 30% of a monomeric material copolymerizable therewith comprising the steps of extruding from a single die orifice a a heat plastified laminate structure comprising a base layer of styrene polymer and at least one surface layer of an ABS polymer, capable of adhering to said styrene polymer with a bond of at least about 3 lbs/inch, thence laminating a pre-formed layer of said barrier material to the ABS surface layer(s) of said co-extruded laminate and controlling the temperature of said co-extruded laminate and said pre-formed layer of barrier material so that upon lamination said barrier material is heated to a temperature from slightly below its melting temperature to its degradation temperature.

2. The process as defined by claim 1, wherein said pre-formed layer of barrier material is supplied from a roll of sheet material.

3. The process as defined by claim 1, wherein said pre-formed layer of barrier material is supplied directly from a second extrusion die orifice.

4. The process as defined by claim 1, wherein said intermediate layer of ABS polymer has a thickness of from about 1 to 7 mils and said vinylidene chloride co-polymer layer has a thickness of from about 1 to 5 mils.

5. The process as defined by claim 1, wherein said polystyrene is homopolystyrene.

6. The process as defined by claim 1, wherein said polystyrene is impact polystyrene.

7. The process as defined by claim 1, wherein said laminated structure consists of said base layer, said intermediate layer and said surface layer.

8. The process as defined by claim 1, wherein said temperature control step comprises selecting a distance between said die orifice and the point of laminating said pre-formed layer of barrier material sufficient to provide the said temperature of the barrier material.

9. The process as defined by claim 1, wherein said temperature control step comprises cooling said co-extruded laminate after it leaves said die orifice but before said barrier material is laminated thereto.

10. The process as defined by claim 1, wherein said extrusion step comprises extrusion of a laminate structure comprising a base layer having both major surfaces covered by a surface layer of said ABS polymer and wherein said lamination step comprises laminating a pre-formed layer of said barrier material to both ABS surface layers.

11. The process as defined by claim 1, wherein said layer of barrier material has a thickness of from about 5 to 10 mils.

12. The process as defined by claim 1, wherein said base layer has a thickness of from about 10 to 40 mils.

13. The process as defined by claim 1, wherein said barrier material is a copolymer of vinylidene chloride with a minor portion of vinyl chloride.

14. The process as defined by claim 13, wherein said temperature of the barrier material is between about 380° and 430° F.

15. The process as defined by claim 14, wherein said temperature is between about 405° and 415° F.

16. The process as defined by claim 1, further comprising the step of applying pressure to the final laminated structure.

17. The process as defined by claim 16, wherein said pressure applying step comprises passing said laminated structure between at least one pair of rollers.

* * * * *

UNITED STATES PATENT OFFICE
CERTIFICATE OF CORRECTION

Patent No. 4,076,570        Dated February 28, 1978

Inventor(s) Ronald D. MEDLEY and James R. CHAPMAN

It is certified that error appears in the above-identified patent and that said Letters Patent are hereby corrected as shown below:

Cover Page, line [73], after "COSDEN TECHNOLOGY, INC., Big Spring, Texas", kindly add -- and THE MEAD CORPORATION, Dayton, Ohio --.

Signed and Sealed this

Twenty-fourth Day of October 1978

[SEAL]

Attest:

RUTH C. MASON
Attesting Officer

DONALD W. BANNER
Commissioner of Patents and Trademarks